(12) United States Patent
Tanno et al.

(10) Patent No.: US 11,280,223 B2
(45) Date of Patent: Mar. 22, 2022

(54) BOLT FASTENING STRUCTURE AND TURBO-MACHINE USING SAME

(71) Applicant: Hitachi, Ltd., Tokyo (JP)

(72) Inventors: Youhei Tanno, Tokyo (JP); Takeshi Kazama, Tokyo (JP); Ryuhei Tsukahara, Tokyo (JP); Taiji Hashimoto, Tokyo (JP); Tomohiro Naruse, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 832 days.

(21) Appl. No.: 16/088,966

(22) PCT Filed: Mar. 23, 2017

(86) PCT No.: PCT/JP2017/011621
§ 371 (c)(1),
(2) Date: Sep. 27, 2018

(87) PCT Pub. No.: WO2017/179384
PCT Pub. Date: Oct. 19, 2017

(65) Prior Publication Data
US 2019/0055855 A1    Feb. 21, 2019

(30) Foreign Application Priority Data

Apr. 12, 2016    (JP) .............................. JP2016-079570

(51) Int. Cl.
*F01D 25/24*    (2006.01)
*F04D 29/60*    (2006.01)
(Continued)

(52) U.S. Cl.
CPC ........... *F01D 25/243* (2013.01); *F04D 29/40* (2013.01); *F04D 29/60* (2013.01); *F16B 5/02* (2013.01);
(Continued)

(58) Field of Classification Search
CPC ................. F01D 25/243; F01D 25/265; F04D 29/40–566; F04D 29/60–648
See application file for complete search history.

(56) References Cited

U.S. PATENT DOCUMENTS 6,199,453 B1 *  3/2001  Steinbock ............. B23P 19/068
                                                                    29/452
7,198,465 B1 *  4/2007  Ichiryu ................. F01D 25/243
                                                                    415/214.1
(Continued)

FOREIGN PATENT DOCUMENTS

JP        4-105667 U      9/1992
JP        2002-61562 A    2/2002
(Continued)

OTHER PUBLICATIONS

International Search Report (PCT/ISA/210) issued in PCT Application No. PCT/JP2017/011621 dated Jun. 13, 2017 with English translation (five (5) pages).
Japanese-language Written Opinion (PCT/ISA/237) issued in PCT Application No. PCT/JP2017/011621 dated Jun. 13, 2017 (four (4) pages).

*Primary Examiner* — Courtney D Heinle
*Assistant Examiner* — Andrew J Marien
(74) *Attorney, Agent, or Firm* — Crowell & Moring LLP

(57) ABSTRACT

A bolt fastening structure has an upper flange and a lower flange of a casing to which inner pressure is applied, the upper flange and the lower flange defining an abutting interface therebetween; a bolt hole formed through the abutting interface; and a counterbored portion formed asymmetric about a bolt hole center. The abutting interface includes a first region extending from a bolt hole inner side edge to an upper and lower flanges inner edge and being a region where the upper flange and the lower flange are in surface-to-surface contact with each other; and a partial contact region extending from a bolt hole outer side edge to an upper and lower flanges outer edge and being a region (Continued)

where the upper flange and the lower flange are partially in surface-to-surface contact with each other. In the partial contact region, the upper flange and the lower flange are in surface-to-surface contact with each other in a second region, and the first region is larger than the second region.

14 Claims, 5 Drawing Sheets

(51) Int. Cl.
    *F16B 5/02*     (2006.01)
    *F04D 29/40*     (2006.01)
(52) U.S. Cl.
    CPC ...... *F05D 2240/55* (2013.01); *F05D 2260/31* (2013.01)

(56) References Cited

U.S. PATENT DOCUMENTS

| | | | |
|---|---|---|---|
| 2012/0163963 A1 | 6/2012 | Hashimoto et al. | |
| 2015/0104337 A1* | 4/2015 | Schoelen | F04D 13/10 417/410.1 |
| 2016/0265553 A1* | 9/2016 | Annati | F04D 29/624 |
| 2021/0033029 A1* | 2/2021 | Fallon | F01D 25/28 |

FOREIGN PATENT DOCUMENTS

| | | |
|---|---|---|
| JP | 2002-156490 A | 5/2002 |
| JP | 2010-209750 A | 9/2010 |
| JP | 2011-169246 A | 9/2011 |
| JP | 2015-042881 A | 3/2015 |
| JP | 2017-40184 A | 2/2017 |

* cited by examiner

BOLT FASTENING STRUCTURE AND TURBO-MACHINE USING SAME

TECHNICAL FIELD

The present invention relates to a bolt fastening structure and a turbo-machine using the same.

BACKGROUND

As oil and gas industries evolve, there have been increasing demands for high-pressurizing and/or diameter enlargement of turbo-machines. However, high-pressurizing and/or diameter enlargement of a turbo-machine may possibly cause leakage of high pressure gas from inside a housing of the turbo-machine through bolt units of a casing that serves as the housing.

There are two major types of casings, i.e., the horizontally split type and the barrel type. A horizontally split type casing has horizontally split upper and lower casings between which a rotor system having an impeller, a shaft and the like is disposed. The upper and lower casings are sealed by fastening flanges thereof with bolts. A barrel type casing has a cylindrical casing in which an inner casing and a rotor system are inserted in an axial direction. The cylindrical casing is sealed by fastening headcovers to opposite ends of the cylindrical casing with bolts. Horizontally split type casings have good maintainability and barrel type casings have good hermeticity.

A consideration for horizontally split type casings is prevention of leakage of the gas compressed in the casing, to achieve high-pressurizing and/or diameter enlargement (upsizing). To prevent the leakage, sealing sections of the casing are firmly fastened with bolts. As a measure to enhance a fastening force by bolts, there has been proposed a method for decreasing a contact area in abutting surfaces of upper and lower flanges by working the abutting surfaces to form gaps therebetween such as grooves or counterbored portions.

As a technique related to a bolt fastening structure in which grooves or counterbored portions are formed on an abutting interface between upper and lower flanges, patent document 1 proposes a bolt fastening structure in which ridges are formed on the inner and outer sides of an abutting interface between upper and lower flanges, and patent document 2 proposes a bolt fastening structure in which a bolt-clearance portion (counterbored portion) is formed left-right symmetric about a bolt hole center.

PRIOR ART DOCUMENT

Patent Document

Patent document 1: Japanese Unexamined Patent Application Publication No. 2010-209750
Patent document 2: Japanese Unexamined Patent Application Publication No. 2002-61562

SUMMARY OF INVENTION

Problem to be Solved by the Invention

In the structure described in patent document 1, locally concentrated stress is applied to a portion where the ridges are in contact with the abutting interface or to a corner of the ridges themselves, causing permanent deformation of the abutting interface and/or the ridges. This may possibly decrease the contact surface pressure generated on the abutting interface. In addition, in the structure described in patent document 1, grooves need to be continuously formed on the abutting interface in three regions (a region on an inner side of the inner ridge, a region between the inner ridge and an outer ridge, and a region on an outer side of the outer ridge) to form the ridges.

In the structure described in patent document 2, although the contact surface pressure applied to the abutting interface between the upper and lower flanges is enhanced as a whole, it is difficult to effectively enhance the fastening force applied on a side on the abutting interface to which the inner pressure influencing hermeticity of the casing is applied.

The present invention solves the above described problems. It is an object of the present invention to provide bolt fastening stricture and a turbo-machine which are capable of improving the hermeticity with a simple structure.

Solution to Problem

The present invention provides a bolt fastening structure including: an upper flange and a lower flange of a casing to which inner pressure is applied, the upper flange and the lower flange defining an abutting interface therebetween where the upper flange and the lower flange are abutted together; a bolt hole formed through the abutting interface; and a counterbored portion formed asymmetric about a center of the bolt hole. The abutting interface includes: a first region extending from an inner side edge of the bolt hole to an inner edge of the abutting interface and being a region where the upper flange and the lower flange are in surface-to-surface contact with each other; and a partial contact region extending from an outer side edge of the bolt hole to an outer edge of the abutting interface and being a region where the upper flange and the lower flange are partially in surface-to-surface contact with each other. In the partial contact region, the upper flange and the lower flange are in surface-to-surface contact with each other in a second region, and the first region is larger than the second region.

Effects of Invention

Present invention provides a bolt fastening structure and a turbo-machine which are capable of improving the hermeticity with a simple structure.

BRIEF DESCRIPTION OF THE DRAWINGS

FIG. 1A is a perspective view of the bolt fastening structure. FIG. 1B is a cross-sectional view taken along line A-A in FIG. 1A.

EMBODIMENTS FOR CARRYING OUT THE INVENTION

Hereinafter, a description is given of an embodiment according to the present invention with reference to the drawings.

First Embodiment

Figure 1A:
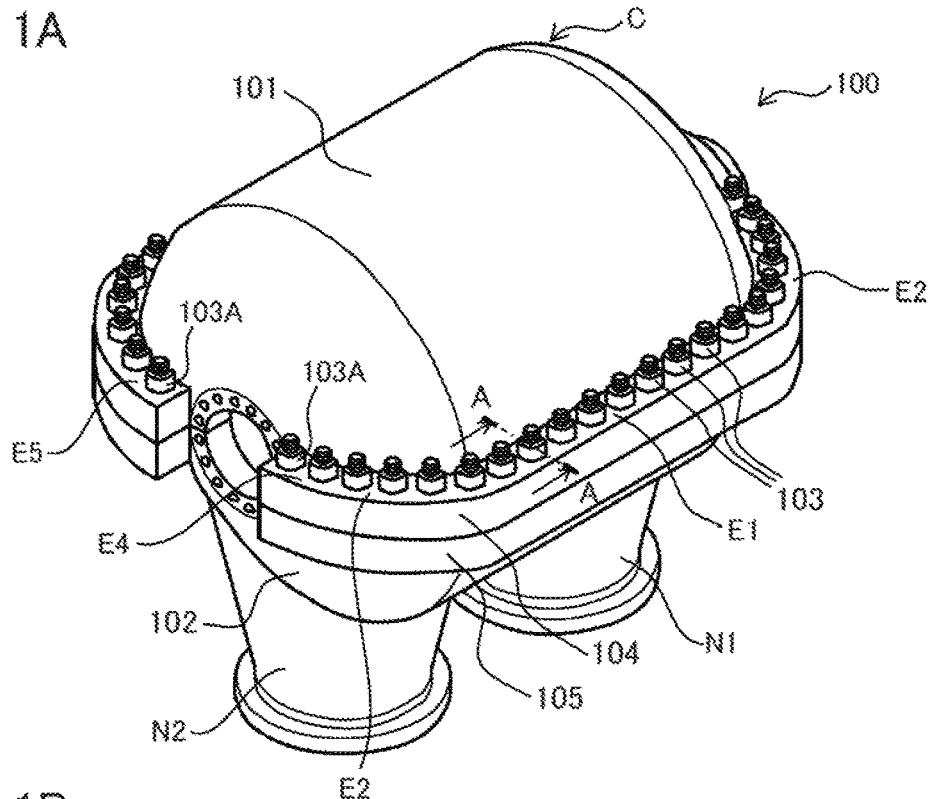
FIGS. 1A and 1B show a configuration of a bolt fastening structure according to a first embodiment.
Figure 1B:
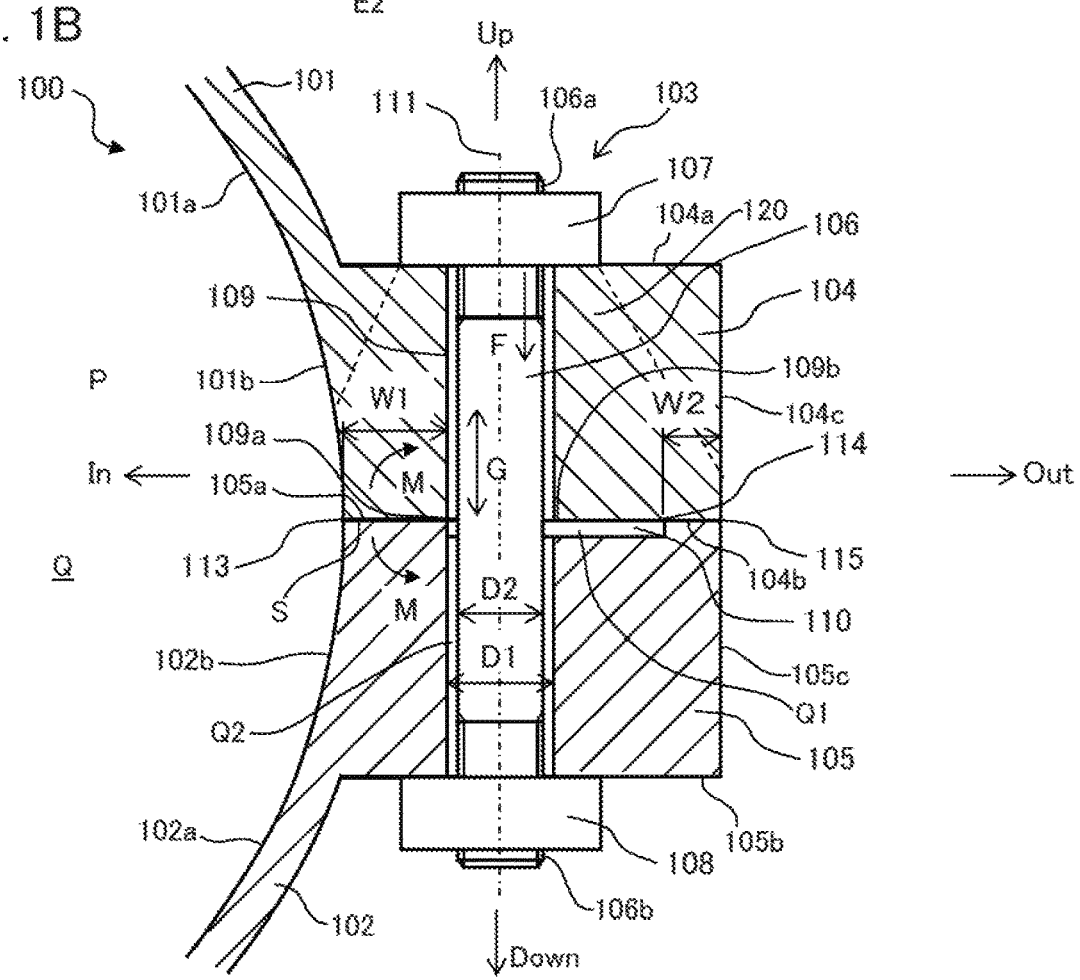
Figure 2:
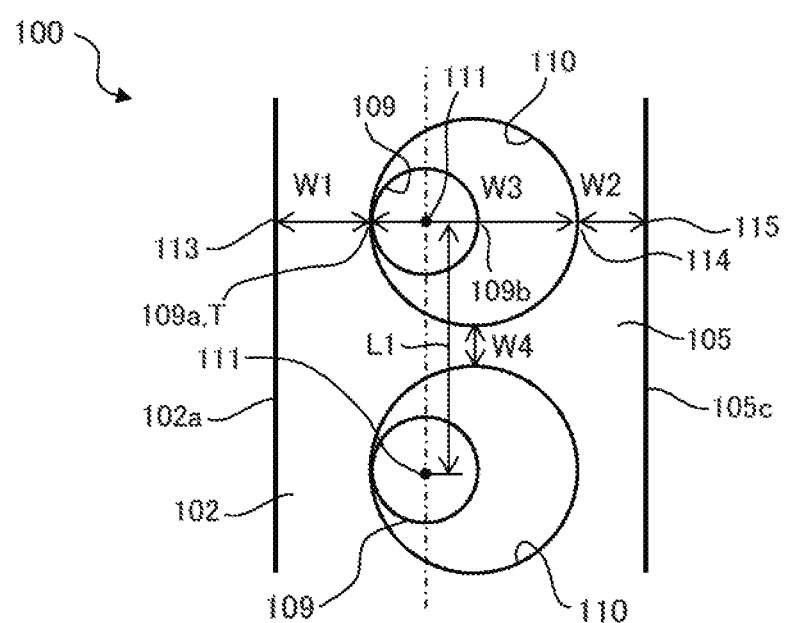
FIG. 2 is a plan view showing a counterbored portion of the first embodiment.
Figure 3:
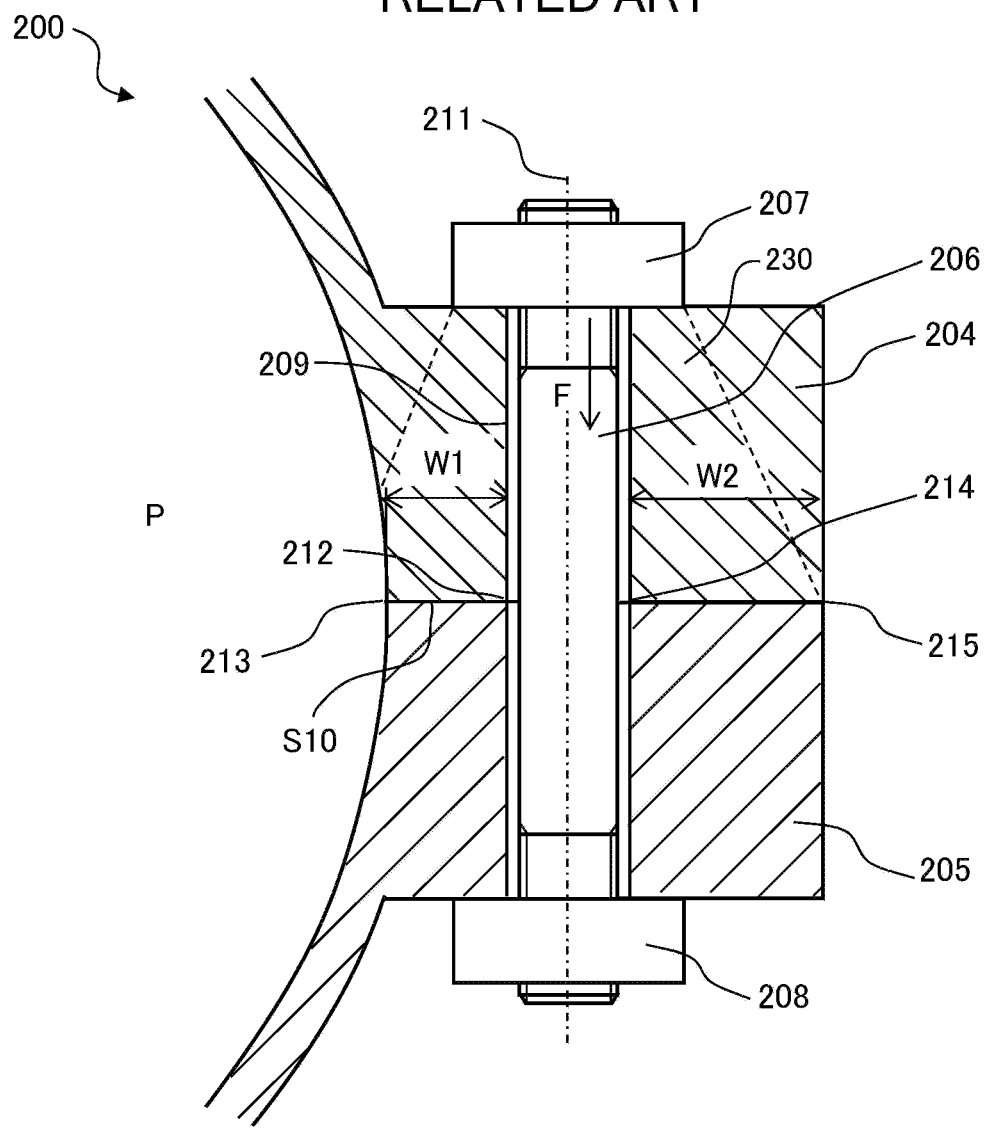
FIG. 3 shows a conventional bolt fastening structure as a reference example.

FIGS. 1A and 1B show a configuration of a bolt fastening structure according to a first embodiment. FIG. 1A is a perspective view of the bolt fastening structure. FIG. 1B is a cross-sectional view taken along line A-A in FIG. 1A. FIG. 2 is a plan view showing a counterbored portion of the first embodiment. FIG. 3 shows a conventional bolt fastening structure as a reference example.

A bolt fastening structure 100 according to the embodiment of the present invention is described taking an example of a turbo-machine to which the bolt fastening structure 100 has been applied as shown in FIG. 1A. It should be noted that, in FIG. 1A, illustration of a rotation shaft journaled in a casing C and an impeller provided therein is omitted.

The casing C has an upper casing 101 and a lower casing 102, which are fastened to each other by bolt units 103. The casing C functions also as a pressure container.

The upper casing 101 has a substantially half-cylindrical shape and has an edge from which an upper flange 104 extends outwardly. The lower casing 102 has a substantially half-cylindrical shape and has an edge from which a lower flange 105 extends outwardly. The lower casing 102 includes an inlet nozzle N1 and an outlet nozzle N2, which project downwardly. High pressure gas is sealed in the casing C by fastening the upper flange 104 to the lower flange 105 by bolt units 103. Although the casing C shown in FIG. 1A is an example configured such that the inlet nozzle N1 and the outlet nozzle N2 are directed downward, the casing C may be configured such that the inlet nozzle N1 and the outlet nozzle N2 are directed upward.

As shown in FIG. 1B, an inner wall surface 101a of the upper casing 101 is curved in a direction such that the inner wall surface 101a is away from the upper flange 104 as the inner wall surface 101a extends upwardly. An inner wall surface 102a of the lower casing 102 is curved in a direction such that the inner wall surface 102a is away from the lower flange 105 as the inner wall surface 102a extends downwardly. The inner wall surface 101a and the inner wall surface 102a are configured to define a continuous curved surface when the upper flange 104 and the lower flange 105 are fastened together. It should be noted that, the shape of the casing C (see FIG. 1A) is not limited to that of the present embodiment so long as inner pressure P is applied to the casing C, and can be modified as appropriate.

The bolt fastening structure 100 comprises the upper flange 104, the lower flange 105, a stud 106 (bolt), an upper nut 107, a lower nut 108, a bolt hole 109, and a counterbored portion 110. The stud 106, the upper nut 107, and the lower nut 108 make up a bolt unit 103.

The upper flange 104 is formed in the upper casing 101 such as to project outwardly (in a horizontal direction) from an edge portion 101b of the upper casing 101. The upper flange 104 has a substantially rectangular shape in cross-sectional view, and has an upper surface 104a extending in a horizontal direction, a lower surface 104b extending in parallel with the upper surface 104a, and a side surface 104c extending in an up-down (vertical) direction.

The lower flange 105 is formed in the lower casing 102 such as to project outwardly (in a horizontal direction) from an edge portion 102b of the lower casing 102. The lower flange 105 has a substantially rectangular shape in cross-sectional view, and has an upper surface 105a extending in the horizontal direction and facing the lower surface 104b, a lower surface 105b extending in parallel with the upper surface 105a, and a side surface 105e extending in the up-down (vertical) direction.

The lower surface 104b of the upper flange 104 and the upper surface 105a of the lower flange 105 are configured such that they correspond in an up-down direction and the side surface 104c of the upper flange 104 and the side surface 105c of the lower flange 105 are flush with each other.

The lower flange 105 has the counterbored portion 110. The counterbored portion 110 is a recess formed on the upper surface 105a such that the counterbored portion 110 is apart from the lower surface 104b of the upper flange 104. The whole of the lower surface 104b of the upper flange 104 and the whole of the upper surface 105a of the lower flange 105 are in surface-to-surface contact with each other except the counterbored portion 110.

The counterbored portion 110 is formed in the lower flange 10 on an abutting interface S where the lower surface 104b of the upper flange 104 and the upper surface 105a of the lower flange 105 are to be abutted together, such that the counterbored portion 110 is asymmetric about a bolt hole center 111, which is the center of the bolt hole 109, in an in-out direction of the casing C (see FIG. 1). The abutting interface S includes a region extending from a bolt hole inner side edge 109a (inner side edge of the bolt hole) to an inner edge 113 of the abutting interface S (upper and lower flanges inner edge), in which region the lower surface 104b of the upper flange 104 and the upper surface 105a of the lower flange 105 are in surface-to-surface contact with each other. The abutting interface S also includes a region extending from a bolt hole outer side edge 109b, i.e., an outer side edge of the bolt hole 109, to an outer edge 115 of the abutting interface S (upper and lower flanges outer edge), in which region the lower surface 104b of the upper flange 104 and the upper surface 105a of the lower flange 105 are partially in surface-to-surface contact with each other. The bolt hole outer side edge 109b (outer side edge of bolt hole) and the bolt hole inner side edge 109a are 180 degrees opposite to each other with respect to the bolt hole center 111.

The bolt hole 109 is formed through the abutting interface S between the upper flange 104 and the lower flange 105. The bolt hole 109 is formed to penetrate the upper flange 104 and the lower flange 105 in a straight line in an up-down direction (direction perpendicular to the abutting interface S). The bolt hole 109 is formed with an inner diameter (diameter) D1 slightly larger than the diameter (external diameter) D2 of the stud 106. The bolt hole 109 is formed with the same diameter D1, from the upper surface 104a of the upper flange 104 to the lower surface 105b of the lower flange 105.

The stud 106, which is inserted in the bolt hole 109, has a rod shape and has in an axial direction G a length longer than a thickness of the upper flange 104 and the lower flange 105 overlaid therewith. The stud 106 has opposite ends that are opposite in the axial direction G, on which ends male screws 106a and 106b are respectively formed. When the stud 106 is inserted in the bolt hole 109, a portion of the male screw 106a projects past the upper surface 104a of the upper flange 104, and a portion of the male screw 106b projects past the lower surface 105b of the lower flange 105. The stud 106 has a cylindrical portion extending in an axial direction thereof and having no male screw, between the male screw 106a and the male screw 106b.

While the stud 106 is inserted in the bolt hole 109, the upper nut 107 is threadedly engaged with the male screw 106a and the lower nut 108 is threadedly engaged with the male screw 106b, to fasten the upper flange 104 to the lower flange 105, with the upper flange 104 being brought into close contact with the upper surface 104a and with the lower flange 105 being brought into close contact with the lower surface 105b.

As shown in FIG. 2, the counterbored portion 110 has a larger diameter than the bolt hole 109. The counterbored portion 110 is not concentric with the bolt hole 109 and is located such that an innermost portion and an outermost portion of the counterbored portion 110 is asymmetric (in an in-out direction) about the bolt hole center 111, which is the center of the bolt hole 109. The counterbored portion 110 has a circular shape in a plan view as seen in the axial direction G (see FIG. 1B) of the bolt hole 109. The counterbored portion 110 is configured such that the counterbored portion 110 has a center outwardly displaced from the bolt hole center 111 and such that the inner side edge of the counterbored portion 110 and the bolt hole inner side edge 109a are located at the same point T. Accordingly, the counterbored portion 110 is not located inwardly of the bolt hole inner side edge 109a. Incidentally, the bolt hole inner side edge 109a is an edge of the bolt hole 109 and is closest to the inner wall surface 102a of the lower casing 102 (inner wall surface 101a of the upper casing 101), in the abutting interface S (see FIG. 1B). The inner side edge of the counterbored portion 110 is an edge of the counterbored portion 110 and is closest to the inner wall surface 102a of the lower casing 102, in the abutting interface S (see FIG. 1B). That means the bolt hole inner side edge 109a and the inner side edge of the counterbored portion 110 are in contact with each other at point T.

When the diameter of the counterbored portion 110 is W3, adjacent bolt holes 109, 109 are disposed such that a distance L1 between the bolt hole centers 111, 111 of the bolt holes 109, 109 is longer than W3. With this configuration, the upper flange 104 (see FIG. 1B) and the lower flange 105 abut together in a region W4 between adjacent counterbored portions 110, 110.

When a distance (region) from the bolt hole inner side edge 109a to the upper and lower flanges inner edge 113 (inner edge of the abutting interface S) is W1 and a distance (region) from an outer side edge 114 of the counterbored portion 110 to the upper and lower flanges outer edge 115 (outer edge of the abutting interface S) is W2, the bolt hole 109 and the counterbored portion 110 are formed such that the region W1 is larger than the region W2. Note that the upper and lower flanges inner edge 113, the bolt hole inner side edge 109a (point T), the bolt hole outer side edge 109b, the outer side edge 114 of the counterbored portion 110, and the upper and lower flanges outer edge 115 are all located on a straight line perpendicular to the inner wall surface 102a of the lower casing 102 or the side surface 105c of the lower flange 105. The upper and lower flanges inner edge 113 is located at a position where an extension line of a straight line passing through the bolt hole inner side edge 109a, the bolt hole center 111, and bolt hole outer side edge 109b in the abutting interface S (see FIG. 1B) intersects the inner wall surface 102a of the lower casing 102 (inner wall surface 101a of the upper casing 101). The upper and lower flanges outer edge 115 is located at a position where the extension line of the line passing through the bolt hole inner side edge 109a, the bolt hole center 111, and bolt hole outer side edge 109b in the abutting interface S (see FIG. 1B) intersects the side surface 105c of the lower flange 105 (side surface 104c of the upper flange 104). These positional relationships apply to any adjacent pairs of bolt hole 109 and counterbored portion 110.

As described, the upper flange 104 (see FIG. 1B) and the lower flange 105 are in surface-to-surface contact with each other in the regions W1, W2, and W4, but are not in the regions W3 (regions where the counterbored portions 110 are formed).

In the first embodiment, by merely working the circular counterbored portions 110 each of which is left-right asymmetric as shown (asymmetric in an in-out direction) relative to the corresponding bolt hole 109 so that the region W1 is larger than the region W2, the fastening force on the W1 side to which the inner pressure P (see FIG. 1B) is applied can be enhanced. The counterbored portion 110 may be formed for each of all the bolt holes 109 or may be formed only in limited portions where an opening is likely to be generated in an upper and lower flanges inner edge 113, i.e., only for bolt units 103A (103) located closest to end portions indicated by signs E4 and E5 (see FIG. 1A).

It should be noted that, although the present embodiment has been described taking an example of the bolt hole 109 provided with the circular counterbored portion 110, the bolt hole 109 may be provided with a counterbored portion having another shape such as elliptic, rectangular, and polygonal forms. In any case of an elliptical counterbored portion and a rectangular counterbored portion, the counterbored portion is formed asymmetric about the bolt hole 109 in the in-out direction and the bolt hole inner side edge 109a is in point contact with an inner side edge of the counterbored portion, similarly to the case of the circular counterbored portion.

Returning to FIG. 1B, in the present embodiment, the upper flange 104 and the lower flange 105 are configured such that they are in surface-to-surface contact in the regions W1 and W2 of the abutting interface S, where the upper flange 104 and the lower flange 105 are to be abutted together, and such that the region W1 is larger than the region W2. Here, the region W1 extends from the bolt hole inner side edge 109a, which is an inner side edge of the bolt hole 109 and to which counterboring operation has not been applied, to the upper and lower flanges inner edge 113, i.e., an inner edge of the abutting interface S. The region W2 extends from the outer side edge 114 of the counterbored portion 110 to the upper and lower flanges outer edge 115, i.e., an outer edge of the abutting interface S. Note that the bolt hole inner side edge 109a means an innermost edge (edge closest to a space Q in the casing C) of the bolt hole 109. Note also that the outer side edge 114 of the counterbored portion 110 means an outermost edge (edge closest to the outside of the casing C) of the counterbored portion 110.

As described, the region W1, where the upper flange 104 is in contact with the lower flange 105 on the inner side of the bolt unit 103, is configured to be larger (wider) than the region W2, where the upper flange 104 is in contact with the lower flange 105 on the outer side of the bolt unit 103. With this configuration, a compression field 120 generated between the upper flange 104 and the lower flange 105 by a bolt axial force F of the bolt unit 103 is easily deviated toward the region W1 side. That means, the configuration allows for improving the fastening force that fastens the upper flange 104 and the lower flange 105 together on the casing C side (inner side, i.e., space Q side) thereof, to which the inner pressure P is applied. Therefore, the configuration inhibits an opening from being generated by the inner pressure P in the upper and lower flanges inner edge 113 of the abutting interface S, where the upper flange 104 and the lower flange 105 are to be abutted. That is, the configuration inhibits separation between the upper flange 104 and the lower flange 105, and thus improves the hermeticity of the casing C. Note that the compression field 120 is generated in a conical region indicated by the dotted lines, in which conical region the upper flange 104 deforms due to the compression force applied by the upper nut 107 fastening the upper flange 104. The above description has been made solely with the compression field 120 generated in the upper flange 104 with reference to FIG. 1B. However, a compression field is generated also in the lower flange 105 and acts to inhibit generation of the opening, in a manner similar to that described above.

It should be noted that, as the compression field 120 is easily deviated toward the side of the region W1, the fastening force on the side of the region W2 is decreased. However, this does not affects the hermeticity of the casing C. When the inner pressure P is applied, moments M, M (see FIG. 1B) are generated in directions such as to generate an opening in the upper and lower flanges inner edge 113. The structure causing the surface-to-surface contact in the region W2, which extends from the outer side edge 114 of the counterbored portion 110 to the upper and lower flanges outer edge 115, acts as resistance to the moments M, M, and thus can inhibit an opening from being generated in the upper and lower flanges inner edge 113.

In addition, due to the surface-to-surface contact in the whole region W1 of excess surface pressure is prevented, and thus a decrease in the surface pressure due to permanent deformation or the like is unlikely to occur. The counterbored portion 110 is formed in one place only, asymmetric about the bolt hole center 111 in an in-out direction (left-right asymmetric as shown), to form the regions W1 and W2. As the counterbored portion 110 is formed in one place, the counterbored portion 110 can be formed by a single work operation. Meanwhile, when forming an inner ridge on an inner side of a bolt hole as well as forming an outer ridge on an outer side of the bolt hole as in the patent document 1, counterbored portions need to be formed in: a region on an inner side of the inner ridge, a region on an outer side of the outer ridge, and a region between the inner ridge and the outer ridge. That is, counterbored portions need to be formed respectively in three regions (by three work operations). In contrast, in the present embodiment, a single counterbored portion 110 is formed in one place only, around the periphery of the bolt hole 109. As understood from the above, by forming the single counterbored portion 110 in one place, the present embodiment decreases the cost of working while improving the hermeticity of the casing C in a simple structure.

Incidentally, the conventional bolt fastening structure 200 shown in FIG. 3 as a reference example is composed of an upper flange 204, a lower flange 205, a stud 206, an upper nut 207, a lower nut 208, and a bolt hole 209 in the upper and lower flanges. The bolt fastening structure 100 shown in FIG. 1B differs from the bolt fastening structure 200 shown in FIG. 3 in that, in the bolt fastening structure 100, the counterbored portion 110 is formed asymmetric about the bolt hole center 111 in the in-out direction, whereas, in the bolt fastening structure 200, there is no counterbored portion provided.

In the conventional bolt fastening structure 200, there is no counterbored portion on an abutting interface S10 of the upper flange 204 and the lower flange 205. The upper flange 204 and the lower flange 205 are in surface-to-surface contact with each other in the abutting interface S10, in air entire region extending from an upper and lower flanges inner edge 213, which is an inner edge of the abutting interface S10, to an upper and lower flanges outer edge 215, which is an outer edge of the abutting interface S10. The surface-to-surface contact in the entire region from the upper and lower flanges inner edge 213 to the upper and lower flanges outer edge 215 creates a larger contact area than that created in the bolt fastening structure 100 with the counterbored portion 110, and thus generates a lower surface pressure on the contact surface than the bolt fastening structure 100. Thus, it is likely to generate an opening in the upper and lower flanges inner edge 213 due to inner pressure P applied from the inside of the casing. In addition, when a region W1 extending from an inner side edge 212 of the bolt hole 209 to the upper and lower flanges inner edge 213 is smaller (narrower) than a region W2 extending from an outer side edge 214 of the bolt hole 209 to the upper and lower flanges, outer edge 215, a compression field 230 (see dotted lines) generated in the upper and lower flanges by a bolt axial force F is likely to be deviated toward the region W2 side, which is likely to reduce the fastening force on the side of the region W1 and thus generate an opening in the upper and lower flanges inner edge 213. Although not shown, a proposal has been made to form a counterbored portion symmetric to the bolt hole center 211, which is the center of the bolt hole 209, in the in-out direction. In such a structure, the contact surface pressure applied to the abutting interface between the upper and lower flanges increases as a whole due to a decrease in the contact area of the upper flange and the lower flange due to the counterbored portion formed therein. However, similarly to the conventional structure shown in FIG. 3, when the surface-to-surface contact region W1 is smaller than the surface-to-surface contact region W2, it is more likely that an opening is generated in the upper and lower flanges inner edge 213 compared to the bolt fastening structure 100.

The bolt fastening structure 100 of the present embodiment solves the problem of the conventional bolt fastening structure 200. In the bolt fastening structure 100 of the present embodiment, the upper flange 104 and the lower flange 105 are in surface-to-surface contact with each other in the region extending from the bolt hole inner side edge 109a to the upper and lower flanges inner edge 113 and are partially in surface-to-surface contact with each other in the region extending from the bolt hole outer side edge 109b to the upper and lower flanges outer edge 115, and the contact region W1 in the former is larger than the contact region W2 in the latter (see FIG. 1B). This structure allows for solving the problem of the conventional bolt fastening structure in a simple structure to improve the hermeticity of the casing C.

Specifically, the contact region W1 of the upper flange 104 and the lower flange 105, which is located on the inner side of the casing C to which the inner pressure P is applied, is made larger than the region W2 located opposite to the region W1 (on the outer side of the casing C). This structure causes a difference in the fastening force between those generated on the inner and outer sides of the bolt hole 109, which effectively enhances the fastening force applied on the side to which the inner pressure P is applied and which affects the hermeticity. The inner pressure P is applied to the inner side of the casing C. As the upper flange 104 and the lower flange 105 are in surface-to-surface contact with each other on the inner side (from the bolt hole inner side edge 109a to the upper and lower flanges inner edge 113), an occurrence of excess surface pressure is prevented, and thus a decrease in the surface pressure due to permanent deformation or the like is unlikely to occur. Application of the inner pressure P causes a moment M to be generated in such a direction that an opening is generated in the upper and lower flanges inner edge 113. However, the surface-to-surface contact made in a part of the region extending from the bolt hole outer side edge 109b to the upper and lower flanges outer edge 115 resists the moment M to inhibit generation of the opening in the upper and lower flanges inner edge 113.

In the bolt fastening structure 100, the region W2, which extends from the outer side edge 114 of the counterbored portion 110 to the upper and lower flanges outer edge 115, is the part in which the surface-to-surface contact is made. With this structure, the region for the surface-to-surface contact that resists the moment M (see FIG. 1B), which causes an opening to be generated in the upper and lower flanges inner edge 113, is located on the side of the outermost edge of the abutting interface S (on the side of the upper and lower flanges outer edge 115). This allows for resisting the moment M with a small force and inhibiting a decrease in the resisting force due to permanent deformation or the like.

In the bolt fastening structure 100, the counterbored portion 110 has a circular shape on the abutting interface S between the upper flange 104 and the lower flange 105. This configuration allows for easily forming the counterbored portion 110 and thus reduces the cost of working the counterbored portion 110.

In the bolt fastening structure 100, the upper flange 104 and the lower flange 105 are fastened to each other via a so-called double nut bolt (stud 106, upper nut 107, and lower nut 108). As this structure generates the compression field 120 from both sides of the upper flange 104 and the lower flange 105, the structure enhances the fastening force in the bolt unit 103 compared to one like a so called embedded bolt with which fastening is made only from one side, and thus improves the hermeticity of the casing C in a simple structure.

The bolt fastening structure 100 can be applied generally to various machines (turbo-machines) that have the bolt unit 103. Examples of such a machine include compressors, pumps, and steam turbines. Application of the bolt fastening structure 100 of the present embodiment to a turbo-machine allows for high-pressurizing and/or diameter enlargement of the turbo-machine.

In the first embodiment, a so-called "double nut bolt" is used in the bolt fastening structure 100. However, various bolts such as embedded bolts and through bolts can be used as well. It should be noted that, although the first embodiment has been described taking an example of a counterbored portion 110 provided on the side of the lower flange 105, the counterbored portion 110 may be provided on the side of the upper flange 104 or may be provided on the both sides of the upper flange 104 and the lower flange 105.

In addition, sealing material such as silicone rubber may be filled into a gap Q1 (see FIG. 1B) formed between the upper flange 104 and the lower flange 105 by forming the counterbored portion 110, and into a gap Q2 (FIG. 1B) between the halt hole 109 and the stud 106. This configuration improves hermeticity between the upper flange 104 and the lower flange 105 and prevents leakage of high pressure gas by the sealing material even if an opening is generated.

Figure 4:
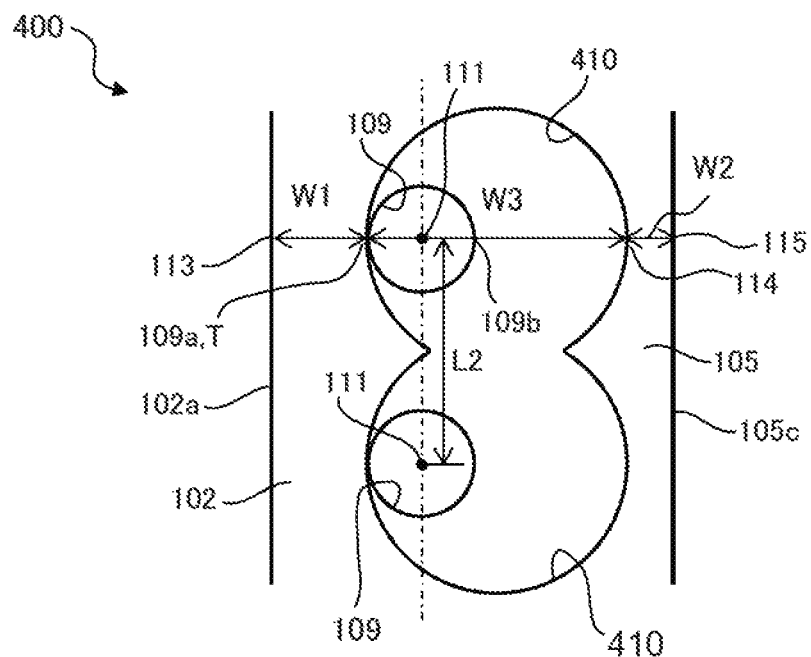
FIG. 4 is a plan view showing a modification example of the counterbored portion of the first embodiment.

FIG. 4 is a plan view showing a modification example of the counterbored portion of the first embodiment. Note that constituent elements that are the same as those in the first embodiment are given the same symbols, and duplicative description thereof is omitted. Other modification examples are also described in this manner as well.

As shown in FIG. 4, in the bolt fastening structure 400, counterbored portions 410 are formed in the lower flange 105. Each of the counterbored portions 410 is not concentric with corresponding one of the bolt holes 109 and is formed asymmetric about the bolt hole center 111 of the corresponding one of the bolt holes 109, in an in-out direction.

When a distance (region) from the bolt hole inner side edge 109a to the upper and lower flanges inner edge 113 is W1 and a distance (region) from an outer side edge 114 of the counterbored portion 410 to the upper and lower flanges outer edge 115 is W2, the bolt hole 109 and the counterbored portion 410 are formed such that the region W1 is larger than the region W2.

The counterbored portion 410 has a substantially circular shape in a plan view as seen in the axial direction G (see FIG. 1B) of the bolt hole 109. The counterbored portion 410 is configured such that the counterbored portion 410 has a center outwardly displaced from the bolt hole center 111 and such that the inner side edge of the counterbored portion 110 and the bolt hole inner side edge 109a are located at the same point T.

When the diameter of the counterbored portion 410 is W3, adjacent bolt holes 109, 109 are located such that a distance L2 between the centers 111, 111 of the bolt holes 109, 109 is shorter than the diameter W3. With this configuration, adjacent counterbored portions 410 partially overlap with each other. FIG. 4 shows two adjacent counterbored portions 410 only. The counterbored portions 410 may be formed for all or some of the bolt units 103 (see FIG. 1A) provided along the upper flange 104 and the lower flange 105. As an example, only the bolt units 103A, 103A (see FIG. 1A), which are respectively located at end portions E4 and E5 (see FIG. 1A) of a series of bolt units 103, may be provided with bolt holes 109 with the counterbored portions 410.

The region where the upper flange 104 (see FIG. 1B) and the lower flange 105 contact with each other includes the regions W1 and W2, but does not include the region W3.

In the bolt fastening structure 400, the upper flange 104 and the lower flange 105 are in surface-to-surface contact with each other in the region extending from the bolt hole inner side edge 109a to the upper and lower flanges, inner edge 113 and are partially in surface-to-surface contact with each other in the region extending from the bolt hole outer side edge 109b to the upper and lower flanges outer edge 115, and the contact region W1 in the former is larger than the contact region W2 in the latter. This structure allows for improving the hermeticity of the casing C in a simple structure.

In the bolt fastening structure 400, counterbored portions 410 of adjacent bolt units 103 partially overlap with each other. This structure allows for reducing the area of the contact region where the upper flange 104 and the lower flange 105 are in contact with each other compared to the case shown in FIG. 2, and thus allows for having an increased surface pressure being applied to the regions where the upper flange 104 and the lower flange 105 are in contact with each other compared to the bolt fastening structure 100 in which the counterbored portion 110 shown in FIG. 2 is provided.

In the bolt fastening structure 400, as the region extending from the outer side edge 114 of the counterbored portion 410 to the upper and lower flanges outer edge 115 functions as the surface-to-surface contact region in the partial contact region, the region extending from the outer side edge 114 of the counterbored portion 410 to the upper and lower flanges outer edge 115 can receive the resisting force that resists an opening being generated in the upper and lower flanges inner edge 113 with a smaller force. This allows for inhibiting a decrease in the resisting force due to permanent deformation or the like.

In the bolt fastening structure 400, the counterbored portions 410 each have a circular shape on the abutting interface S between the upper flange 104 (see FIG. 1B) and the lower flange 105. This configuration allows for easily forming the counterbored portions 410 and thus reduces the cost of working the counterbored portions 410.

It should be noted that, even in the modification example shown in FIG. 4, the bolt fastening structure is not limited to the structure in which counterbored portions 410 are formed in the lower flange 105. The counterbored portions 410 may be provided on the side of the upper flange 104 or may be provided on the both sides of the upper flange 104 and the lower flange 105. This configuration is also applicable to a modification example shown in FIG. 5.

Figure 5:
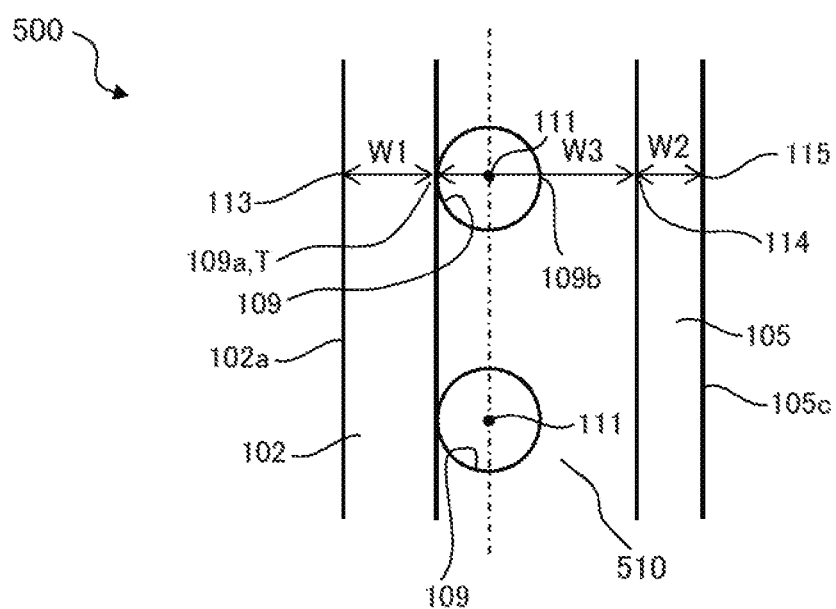
FIG. 5 is a plan view showing another modification example of the counterbored portion of the first embodiment.

FIG. 5 is a plan view showing another modification example of the counterbored portion of the first embodiment.

As shown in FIG. 5, a bolt fastening structure 500 has a counterbored portion 510 formed in the lower flange 105. This counterbored portion 510 is formed in an equal width (region W3) along a series of bolt units 103 and extends continuously in a direction perpendicular to axial directions G (see FIG. 1B) of the bolt holes 109. The counterbored portion 510 is formed in a linear shape in a linear portion E1 (see FIG. 1A) of the lower flange 105, and is formed in a curved shape in a curved portions E2, E2 (see FIG. 1A) of the lower flange 105.

The upper flange 104 (see FIG. 1B) and the lower flange 105 are configured such that they are in surface-to-surface contact with each other except the region W3. That is, they are in surface-to-surface contact with each other in the region W1 extending from the bolt hole inner side edge 109a to the upper and lower flanges inner edge 113 and are in surface-to-surface contact with each other in the region W2 extending from the outer side edge 114 of the counterbored portion 510 to the upper and lower flanges outer edge 115.

When a distance (region) from the bolt hole inner side edge 109a to the upper and lower flanges inner edge 113 is W1 and a distance (region) from an outer side edge 114 of the counterbored portion 510 to the upper and lower flanges outer edge 115 is W2, the bolt hole 109 and the counterbored portion 510 are formed such that the region W1 is larger than the region W2.

In the bolt fastening structure 500, the upper flange 104 and the lower flange 105 are fin surface-to-surface contact with each other in the region extending from the bolt hole inner side edge 109a to the upper and lower flanges inner edge 113 acid are partially in surface-to-surface contact with each other in the region extending from the bolt hole outer side edge 109b to the upper and lower flanges outer edge 115, and the contact region W1 in the former is larger than the contact region W2 in the latter (see FIG. 1B). This structure allows for improving the hermeticity of the casing C in a simple structure.

In the bolt fastening structure 500, as the region extending from the outer side edge 114 of the counterbored portion 510 to the upper and lower flanges outer edge 115 functions as a surface-to-surface contact region in the partial contact region, the region extending from the outer side edge 114 of the counterbored portion 510 to the upper and lower flanges outer edge 115 can receive the resisting force that resists an opening from being generated in the upper and lower flanges inner edge 113 with a smaller force. This allows for inhibiting a decrease in the resisting force due to permanent deformation or the like.

In the bolt fastening structure 500, the counterbored portion 510 has a groove shape extending in a direction perpendicular to the axial direction G (axial direction of the stud 106 (bolt)), on the abutting interface S between the upper flange 104 and the lower flange 105. This structure allows for reducing the area of the contact region where the upper flange 104 and the lower flange 105 are in contact with each other compared to the cases shown in FIGS. 2 and 4, and thus allows for having an increased surface pressure being applied to the regions where the upper flange 104 and the lower flange 105 are in contact with each other compared to the bolt fastening structure 100 and the bolt fastening structure 400 in which the counterbored portions 110 shown in FIG. 2 and the counterbored portions 410 shown in FIG. 4 are provided, respectively.

This configuration of the counterbored portion 510 allows for forming the counterbored portion 510 more easily and thus reducing the cost of working the counterbored portion 510 compared to the case in which a plurality of bolt holes 109 are each provided with the counterbored portion 110 or the counterbored portion 410. This configuration of the counterbored portion 510 allows for reducing the area of the contact area where the upper flange 104 and the lower flange 105 are in contact with each other compared to the cases shown in FIGS. 2 and 4, and thus allows for having an increased surface pressure being applied to the regions where the upper flange 104 and the lower flange 105 are in contact with each other compared to the bolt fastening structure 100 and the bolt fastening structure 400 in which the counterbored portions 110 shown in FIG. 2 and the counterbored portions 410 shown in FIG. 4 are provided, respectively.

Second Embodiment

Figure 6:
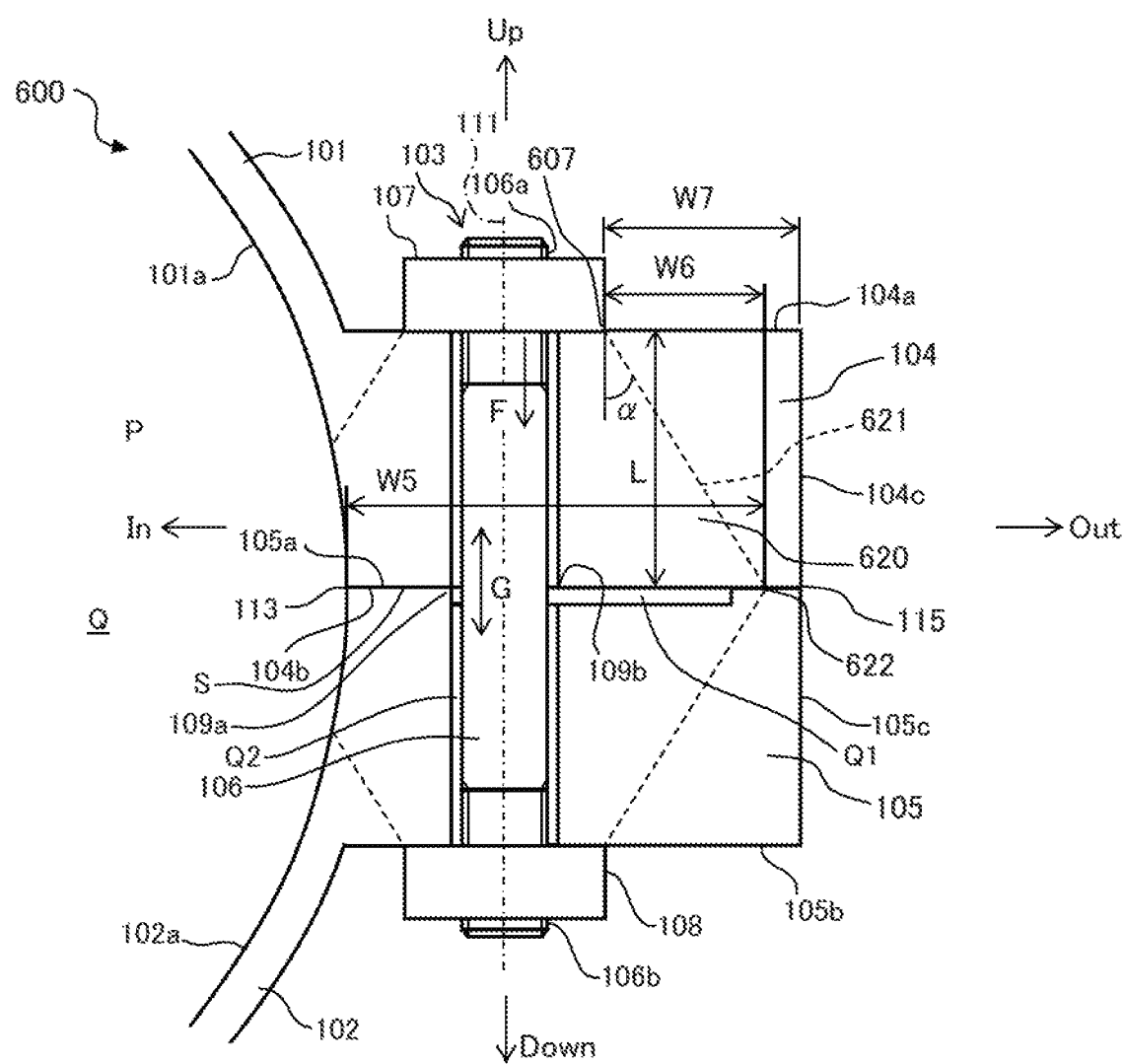
FIG. 6 shows a configuration diagram of a bolt fastening structure according to a second embodiment.

FIG. 6 shows a configuration diagram of a bolt fastening structure according to a second embodiment. Of the constituent elements of a bolt fastening structure 600, descriptions are omitted for elements having the same configuration or the function as those in the bolt fastening structure 100 already described and shown in FIG. 1. In addition, in FIG. 6, oblique lines (hatching) representing cross sections are omitted taking visibility into account. The bolt fastening structure 600 differ from the bolt fastening structure 100 in that a distance from a nut outer side edge 607 to the upper and lower flanges outer edge 115 is determined taking into account an influential range of a compression field 620.

As shown in FIG. 6, in the bolt fastening structure 600, the bolt axial force F generates the compression field 620 in the upper flange 104 and the lower flange 105. The compression field 620 extends from the nut outer side edge 607, which is an outer side edge of the upper nut 107, toward the abutting interface S between the upper flange 104 and the lower flange 105, such that a boundary line 621 (dotted line) of the compression field 620 extends in an inclined angle to form a conical shape of the compression field 620. Contact surface pressure is generated on the abutting interface S in a region W5 thereof to which the compression field 620 applies a force. The nut outer side edge 607 is to a portion of the nut 107 and is closest to the side surface 104c on the upper surface 104a, where the upper nut 107 and the upper flange 104 are in contact with each other. That is, the nut outer side edge 607 means an outermost portion of the upper nut 107, on the upper surface 104a. The greater the area of the compression field 620, the greater the resisting force that resists the moment M (see FIG. 1B) which is caused by the inner pressure P and which applies a force in a direction such that an opening is generated. Thus, the hermeticity of the casing C is improved. The boundary line 621 of the compression field 620 is inclined at an inclination angle α (e.g., 30 degrees) relative to the vertical direction (up-down direction). This inclination angle is derived from dimensions of relevant portions by an approximation. A boundary line section from the nut outer side edge 607 to a boundary line end (boundary line lower end) 622 defines a distance (horizontal distance) W6 parallel to the abutting interface S. The distance W6 is about ½ times a thickness L of the upper flange 104.

In the bolt fastening structure 600, a distance from the nut outer side edge 607 to the upper and lower flanges outer edge 115, which is an outer edge of the abutting interface S between the upper flange 104 and the lower flange 105, defines a distance (region) W7 parallel to the abutting interface S. This distance W7 is selected to be equal to or greater than ½ times the thickness L of the upper flange 104. This configuration allows for increasing the area of the compression field 620 and thus improving the hermeticity of the casing C. It should be noted that, although the second embodiment shown in FIG. 6 has been described taking an example of a case in which the region W7 is larger than the region W6, the region W7 may be the same as the region W6.

As described above, the hermeticity of the casing C can be improved by applying the bolt fastening structure 100, 400, 500, or 600 to the casing C, in a simply structure. Improvement of the hermeticity leads to reduction in the number of bolts (studs 106, upper nuts 107, and lower nuts 108) necessary for fastening, which leads to reduction of materials (bolts and nuts and the like) for bolt units 103 and to reduction of cost of work.

The above described embodiments can be generally applied to various turbo-machines, such as compressors, pumps, steam turbines, having a bolt fastening structure 100, 400, 500, or 600. The embodiments may also be applied to not only turbo-machines but also pressure containers and/or casings (including ones to which pressure is not applied).

REFERENCE SIGNS LIST 100,400,500,600 bolt fastening structure
101 upper casing
102 lower casing
103,103A bolt unit
104 upper flange
105 lower flange
106 stud (bolt, double nut bolt)
107 upper nut (double nut bolt)
108 lower nut (double nut bolt)
109 bolt hole
109a bolt hole inner side edge (inner side edge of bolt hole)
109b bolt hole outer side edge (outer side edge of bolt hole)
110,310,410,510 counterbored portion
111 bolt hole center (center of bolt hole)
113 upper and lower flanges inner edge (inner edge of abutting interface)
114 outer side edge of counterbored portion
115 upper and lower flanges outer edge (outer edge of abutting interface)
120 compression field
607 nut outer side edge (outer edge of nut)
620 compression field
621 compression field boundary line
622 boundary line end
C casing
G axial direction of bolt
M moment
P inner pressure
S abutting interface
W1 region in which surface-to-surface contact is made
W2 surface-to-surface contact region in a region in which partial surface-to-surface contact is made

What is claimed is:

1. A bolt fastening structure comprising:
an upper flange and a lower flange of a casing to which an inner pressure is applied, the upper flange and the lower flange defining an abutting interface therebetween where the upper flange and the lower flange are abutted together, the abutting interface having an inner edge and an outer edge;
a bolt hole formed through the abutting interface and having a bolt hole inner side edge and a bolt hole outer side edge, the bolt hole inner side edge being closest to the inner edge of the abutting interface, the bolt hole outer side edge closest to the outer edge of the abutting interface; and
a counterbored portion formed asymmetric about a center of the bolt hole,
wherein the abutting interface comprises:
a first region extending from the bolt hole inner side edge to the inner edge of the abutting interface and being a region where the upper flange and the lower flange are in surface-to-surface contact with each other; and
a partial contact region extending from the bolt hole outer side edge to the outer edge of the abutting interface and being a region where the upper flange and the lower flange are partially in surface-to-surface contact with each other,
wherein, in the partial contact region, the upper flange and the lower flange are in surface-to-surface contact with each other in a second region, and
wherein the first region has a length W1 along a line extending in an in-out direction of the abutting interface and passing through the center of the bolt hole, the second region has a length W2 along the line, and the length W1 is larger than the length W2.

2. The bolt fastening structure according to claim 1, wherein the counterbored portion has an outer side edge closest to the outer edge of the abutting interface, and wherein the second region extends from the outer side edge of the counterbored portion to the outer edge of the abutting interface.

3. The bolt fastening structure according to claim 1, wherein the counterbored portion has a single continuous shape in a cross section of the upper flange and the lower flange.

4. The bolt fastening structure according to claim 1, wherein the counterbored portion has a circular shape on the abutting interface.

5. The bolt fastening structure according to claim 1, wherein the counterbored portion has a groove shape extending in a direction perpendicular to an axial direction of the bolt, on the abutting interface.

6. The bolt fastening structure according to claim 1, wherein the bolt fastening structure further comprises: a bolt inserted in the bolt hole; and a nut engaged on an end of the bolt to fasten the upper flange and the lower flange together, the nut having an outer side edge closest to the outer edge of the abutting interface, and wherein a projection of a distance from the outer side edge of the nut to the outer edge of the abutting interface onto the abutting interface has a length equal to or greater than ½ times a thickness of the upper flange or the lower flange.

7. The bolt fastening structure according to claim 1, wherein the upper flange and the lower flange is fastened to each other via a double nut bolt.

8. A turbo-machine to which the bolt fastening structure according to claim 1 is applied.

9. A turbo-machine to which the bolt fastening structure according to claim 2 is applied.

10. A turbo-machine to which the bolt fastening structure according to claim 3 is applied.

11. A turbo-machine to which the bolt fastening structure according to claim 4 is applied.

12. A turbo-machine to which the bolt fastening structure according to claim 5 is applied.

13. A turbo-machine to which the bolt fastening structure according to claim 6 is applied.

14. A turbo-machine to which the bolt fastening structure according to claim 7 is applied.

* * * * *